US012059381B2

(12) United States Patent
Gierse

(10) Patent No.: US 12,059,381 B2
(45) Date of Patent: Aug. 13, 2024

(54) ADJUSTMENT DEVICE FOR VEHICLE SEATS

(71) Applicant: In-Tra-Tec GmbH, Remscheid (DE)

(72) Inventor: Klaus Gierse, Weener (DE)

(73) Assignee: In-Tra-Tec GmbH, Remscheid (DE)

( * ) Notice: Subject to any disclaimer, the term of this patent is extended or adjusted under 35 U.S.C. 154(b) by 63 days.

(21) Appl. No.: 17/789,537

(22) PCT Filed: Jan. 7, 2020

(86) PCT No.: PCT/EP2020/050223
§ 371 (c)(1),
(2) Date: Jun. 28, 2022

(87) PCT Pub. No.: WO2021/139879
PCT Pub. Date: Jul. 15, 2021

(65) Prior Publication Data
US 2023/0049930 A1 Feb. 16, 2023

(51) Int. Cl.
*A61G 5/10* (2006.01)

(52) U.S. Cl.
CPC ......... *A61G 5/1059* (2013.01); *A61G 5/1075* (2013.01)

(58) Field of Classification Search
CPC ... A61G 5/1059; A61G 5/1075; A61G 5/1056
See application file for complete search history.

(56) References Cited

U.S. PATENT DOCUMENTS 2,982,336 A * 5/1961 Minici .................... A61G 5/08 280/37
3,522,925 A * 8/1970 Buchtel .................... A47C 3/20 248/371
5,613,255 A * 3/1997 Bish ....................... A61G 7/005 5/610
5,669,620 A * 9/1997 Robbins ................... A61G 3/02 414/921

(Continued)

FOREIGN PATENT DOCUMENTS

CN 106890053 A * 6/2017
CN 107753194 A * 3/2018

(Continued)

OTHER PUBLICATIONS

Translated CN-106890053-A (Year: 2023).*

*Primary Examiner* — James A Shriver, II
*Assistant Examiner* — Ian Bryce Shelton
(74) *Attorney, Agent, or Firm* — Michael Soderman

(57) ABSTRACT

An adjusting device for vehicles comprising at least one mounting plate and one support plate with a lifting device comprising at least two scissor mountings. The scissor mountings are each arranged at the longitudinal side edge or in a corner region of the mounting or support plate and are vertically adjustable via a drive unit. Each scissor mounting takes the form of double scissors and includes a first, lower scissor element and a second, upper scissor element which are connected to each other at one end via a common rotation pin. The lower scissor element is connected at the other end to the mounting plate, and the upper scissor element is connected at the other end to the support plate via fasteners.

9 Claims, 7 Drawing Sheets

(56) References Cited

U.S. PATENT DOCUMENTS

| | | | | |
|---|---|---|---|---|
| 6,105,706 | A * | 8/2000 | Cooper | B60N 2/24 297/344.11 |
| 7,484,805 | B2 * | 2/2009 | Baum | A47B 9/00 297/344.17 |
| 9,073,399 | B1 * | 7/2015 | Richter | B60G 17/0165 |
| 9,700,472 | B2 * | 7/2017 | Gierse | B60N 2/3022 |
| 10,080,701 | B1 * | 9/2018 | Bagheri | A61H 3/008 |
| 2002/0149168 | A1 * | 10/2002 | Brown | A61G 5/1089 280/250.1 |
| 2015/0231002 | A1 * | 8/2015 | Gierse | A61G 5/1075 297/344.17 |

FOREIGN PATENT DOCUMENTS

| | | | | |
|---|---|---|---|---|
| CN | 207950032 | U * | 10/2018 | |
| CN | 109157343 | A * | 1/2019 | |
| EP | 2907694 | A1 * | 8/2015 | A61G 5/04 |
| EP | 2907694 | A1 | 8/2015 | |
| GB | 2564728 | B * | 11/2019 | A47C 1/024 |
| KR | 20160046676 | A * | 4/2016 | |

* cited by examiner

ADJUSTMENT DEVICE FOR VEHICLE SEATS

CROSS REFERENCE TO RELATED APPLICATIONS

This application is the U.S. national stage of International Application No. PCT/EP2020/050223, filed on 2020 Jan. 7.

BACKGROUND

The invention relates to an adjusting device for vehicles, in particular electric wheel chairs or rehabilitation vehicles, recumbent systems and nursing beds, comprising at least one mounting plate and one support plate with a lifting device which comprises at least two scissor mountings which are arranged at the longitudinal side edge or in a corner region of the mounting or support plate each and are vertically adjustable by a driving means, wherein each scissor mounting, formed as double scissors, includes a first, lower scissor element and a second, upper scissor element, which are connected to each other at one end via a common rotation pin, and the lower scissor element is connected at the other end to the mounting plate, and the upper scissor element is connected at the other end to the support plate via fastening means.

Vehicles of most diverse designs are known for passenger traffic, as construction machines, and for the agricultural field. Apart from this, there are electric wheel chairs or rehabilitation vehicles some of which are provided for receiving considerable loads. If construction vehicles or agricultural vehicles, such as tractors, are employed in mountainous terrain, these are equipped with a seat facility which may be brought into a horizontal position by means of pneumatic adjusting cylinders. This measure serves to facilitate work.

With electric wheel chairs or other vehicles provided for the transport of disabled persons, in individual cases a particular adjustment of the seating surface may be also required on a plane route. This may concern, for example, bodily anomalies or disease patterns necessitating to incline the seating surface or to adjust a certain angle of inclination for the relieves or works to be performed. Typical disease patterns, e. g. with a considerable risk of decubitus, are injuries of the spinal cord, such as e. g. tetraplegia, ALS (amyotrophic lateral sclerosis), MS (multiple sclerosis), myopathies, neurological diseases and traumatic brain injuries. By means of an adjusting device, these persons should be remedied at least partially. With the aforementioned category of persons, the spontaneous movements required for pressure relief partially fail. The highly dynamic process of sitting is simulated by the flexibility of the adjusting device. The users protect themselves from pain and the consequential damages of sitting statically.

An adjusting device to be provided for an electric wheel chair must in this case fulfill certain criteria. On the one hand, the overall height must not exceed a certain measure as otherwise, a barrier-free access e. g. to the vehicle is not given, and on the other hand, the electric wheel chairs must not exceed an overall height as the persons normally need a table for carrying out works or their private activities where it must be possible to move the electric wheel chair under this table. Thus, there is a need for the electric wheel chairs or rehabilitation vehicles to be able to assume different changing positions and moreover to fulfil the aforementioned marginal conditions.

From US patent application 2002/0149168 A1, an adjusting device for a wheel chair is known which consists of a double scissor mounting. By means of the double scissor mounting, a high seat height is achieved, wherein a first scissor mounting is directly coupled to a second scissor mounting and the respective free ends of the scissor mountings are connected to the further facilities of the wheel chair.

From EP 2 907 694 B1, an adjusting device for vehicle seats is known which is of the same applicant. From this application, the use of a mounting plate for the seat and a support plate with a lifting device are known which comprises at least two scissor mountings which are arranged at the longitudinal side edge or in a corner region of the mounting or support plate each and are vertically adjustable via a driving means. The scissor mountings are vertically adjustable independently of one another. By this adjusting device, it is possible to adjust an existing seating surface, which is directly connected to the mounting plate, both vertically, but also to perform a lifting in the front and rear regions, so that the user of a wheel chair comes into a rest position, or so that standing up is facilitated. The adjusting device furthermore permits a lateral tilting of the seating surface, for example in order to compensate typical disease patterns of a muscle dystrophy. However, the known adjusting device does not permit to perform a diagonal tilting which is also desired in particular cases.

SUMMARY

The invention relates to an adjusting device 2 for vehicles 1, in particular electric wheel chairs or rehabilitation vehicles, recumbent systems and nursing beds, comprising at least one mounting plate 3 and one support plate 4 with a lifting device 5 comprising at least two scissor mountings 20, which are arranged at the longitudinal side edge or in a corner region of the mounting 3 or support plate 4 each and are vertically adjustable by a driving means, wherein each scissor mounting 20 is formed as double scissors and includes a first, lower scissor element 21 and a second, upper scissor element 22 which are connected to each other at one end via a common rotation pin, and the lower scissor element 21 is connected at the other end to the mounting plate 3, and the upper scissor element 22 is connected at the other end to the support plate 4 via fastening means. In order to achieve a diagonal tilting of the adjusting device, according to the invention, the at least one fastening means consists of a bracket 35 connected to the support plate 4 and a fastening unit 30 axially movable with respect to the bracket 35 at which the ends of the upper scissor elements 22 of at least one scissor mounting 20 are hinged. By means of the bracket 35 and the fastening unit 30, an axial moveability in the longitudinal direction of the vehicle seat 13 is permitted so that no deadlock can occur even in extreme positions of the scissor mountings 20.

DETAILED DESCRIPTION

It is the object of the present invention to improve a known adjusting device with a lifting device for vehicles in such a way that a diagonal tilting of the seating surface is possible.

To achieve the object, at least one fastening means consists of a bracket connected to the support plate and a fastening unit that is axially movable with respect to the bracket at which the ends of the upper scissor elements of at least one scissor mounting are hinged. Further advantageous embodiments of the invention can be found in the subclaims.

Starting from a support plate, which is, for example, connected to the substructure of the electric wheel chair, and a mounting plate, which is essentially provided for mounting the seating surface, an adjusting device is suggested which is located between the mounting plate and the support plate and offers the possibility of an individual height adjustment.

To this end, it is suggested to equip the lifting device with two, three or four scissor mountings. Two scissor mountings are fastened to the longitudinal sides of the mounting plate or the support plate, so that the support plate may be variably adjusted vertically while both scissor mountings are simultaneously loaded. If only one scissor mounting is loaded, a lateral inclination to the left or right may be accomplished. As an alternative, if four scissor mountings are used, these may be located in a corner region of the mounting and the support plates so that there are further possibilities of orienting the support plate. If the rear scissor mountings of the mounting plate are lifted, this will result in an inclination (tilt) of the support plate to the front. If the scissor mountings are lifted at the front, this will result in an inclination (tilt) to the rear. It is furthermore possible to lift the two scissor mountings of the left or right side, so that this will result in an inclination of the seating surface to the right or left. If only a vertical adjustment is desired, all scissor mountings are moved to an approximately identical height. The aforementioned possibilities may also be performed with three scissor mountings.

By the additional equipment of the adjusting device with a fastening means in the form of a bracket connected to the support plate and a fastening unit that is axially movable with respect to the bracket, at which the ends of the upper scissor element or the scissor elements arranged in parallel are fastened in a rotationally movable manner, it is moreover possible to permit an inclination via the diagonal axis of the support plate. To this end, it is necessary to leave, for example, the front right scissor mounting approximately in the lower position, while in contrast, the rear left scissor mounting is nearly completely moved upwards and the two other scissor mountings in the rear right and the front left are only partially moved upwards. As an alternative, a tilting with respect to the second diagonal axis may be effected in a similar way. By the bracket and the fastening unit, the fastening points of the upper scissor elements are shiftable in the longitudinal direction or the direction of travel of the vehicle, respectively. Due to this shifting, no distortion of the individual scissor mountings occurs in a diagonal tilting, and thereby, the function of the adjusting device can be successfully performed without any interferences. The longitudinal movement of the fastening unit with respect to the bracket here compensates the different movements of the individual scissor mountings.

To provide an adjustment of the inclination or a tilting of the seating surface, medical aspects are decisive. Typical disease patterns here are a muscular dystrophy, CP (cerebral palsy), spina bifida. With a lateral tilting of 20°, the vertebral column and the ischial bones are relieved in case of a scoliosis (S-shaped lateral flexion of the vertebral column). The seating surface here has to be inclined laterally as required until the shoulder girdle is oriented horizontally. By this, a natural position of the head and a natural perception are possible. In most cases, the persons concerned can select the period of the change of the position themselves and thus purposefully relieve themselves. In case of a back tilting of 40 degrees, a pressure relieve of the ischial bones that are threatened by decubitus (decubitus prophylaxis) of 70 to 80% is achieved and is therefore also referred to as medical positioning. In this position, eye contact is only possible to a restricted extent. If used on a wheel chair, the additional shifting of the seating surface to the front furthermore permits a compensation of the center of gravity which excludes the risk of tipping due to back tilting. By a back tilting of 20° to 30°, here a comfortable rest or relax position is permitted for the persons concerned. A back tilting of 20° to 25° and a lateral tilting of 15° to 20° (diagonal tilting) results in a pressure relieve increased to 90% (decubitus prophylaxis) for the right or left ischial bone. Eye contact to the directly surrounding area of the seat is here possible without any restrictions.

Patients with the typical disease patterns of a considerable risk of decubitus due to injuries of the spinal marrow, such as ALS, MS, myopathis, neurological diseases and apoplexy, may be aided by this.

By the integrative indication, it is achieved, for example, that with a lift of the seating surface by 20 cm, objects located in higher regions may easily reached and an easy eye contact is permitted. With a lift of the seating surface by 20 cm with a simultaneous or subsequent tilting to the front by up to 40°, persons with restricted mobility or reduced muscular strength are supported during the active process of standing up. When used on a wheel chair, the additional shifting of the seating surface to the front permits a free base without restriction by the front wheels of the wheel chair.

With a lateral tilting of 20° with a variable lift, it is possible to perform a simple laterally sliding transfer, for example to toilets, beds, chairs or nursing beds. In addition, a sliding board can support the sliding function. An independent or slightly supported transfer of persons bound to an electric wheel chair due to a considerably restricted mobility is essential for a self-determined daily life.

The extended adjusting device permits a further position adjustment of the support plate which is equal to the seat's inclination, namely a diagonal tilting. Thus, the desired position a disabled person requires, for example, to assume a sitting posture without any pains and to carry out the desired works, may be advantageously adjusted. A diagonal tilting here simulates the active sitting (micro-positioning). With an inclination of the support plate to the front, for example, ascending and descending are facilitated, while with an inclination to the back, a rest position may be adjusted, for example. By the possible height adjustment of the support plate or the seating surface, here, an adaption to existing table heights may be accomplished at any time, so that the person may drive under a provided table with the front part of the vehicle. Driving on inclined slopes can be compensated by a gyroscopic control so that the person will always remain in the desired seat inclination. The particular advantage of the adjusting device by the use of the scissor mountings is here that the complete design is very compact with respect to its height and thus, a subsequent assembly in existing vehicles is possible. The overall height does not exceed a height of 13 cm and may thus be easily integrated into an existing vehicle or a new vehicle.

Each scissor mounting consists of double scissors, so that sufficient stability of the support plate is achieved and moreover, a high ultimate load can be ensured. The scissor elements of a scissor mounting are here each arranged offset in a plane such that the individual scissor elements do not touch each other. Thus, a deadlock may be excluded and an independent height adjustment ensured.

Here, each scissor mounting consists of four scissor elements each arranged in pairs, in each case one first, lower and one second, upper scissor element being provided. The lower and upper scissor elements with the same direction of inclination are here connected to a rotation pin in one common hinge point. Via the rotation pin, the flexibility of the scissor elements is ensured so that the upper and lower scissor elements may be pivoted with respect to the plane of the rotation pin. The length of the individual scissor elements here determines the maximal stroke distance. Depending on the number of scissor elements used, the length of the individual scissor elements must be adapted to each other or their distance increased as otherwise, there is a risk of a deadlock of the individual scissor elements. As an alternative, the scissor mountings may be offset laterally. In case of two scissor mountings at the longitudinal edges of the support plate, there is sufficient space available. If, however, four scissor mountings are employed, the length of the individual scissor elements must be dimensioned such that the scissor mountings do not touch each other in a retracted position of the scissor mountings. Due to the scissor elements each arranged in pairs, which are mounted via a shaft in a torque-proof manner, both a lifting of the mounting plate and an adjustment of the inclination are possible. During the lifting operation, the central rotation pins of each scissor mounting remain in a horizontal position, wherein the rotation pins approach each other while the scissor mountings are moving upwards, and depart from each other while they are moving downwards. If an inclination is adjusted, the lifted axes of the loaded scissor mountings also remain in a horizontal position, while it is simultaneously ensured that the non-loaded scissor mountings permit a pivoting motion through the upper scissor elements, and a tilting to the front and the back can be performed.

To assemble the scissor mountings, each scissor mounting comprises a first scissor element which is connected, via a first pivot point, to a bracket of the mounting plate or a box-shaped substructure, and, via a second, central pivot point, to a rotation pin, while the second scissor element is connected, via a first pivot point, to the support plate and, via the second, central pivot point, to the rotation pin of the first scissor element. In this embodiment, the free ends of one scissor mounting each are connected to the mounting or support plate via a pivot point. The rotation pins arranged in the central region here serve to mount two lower and two upper scissor elements each, so that they have a common pivot point and may perform a synchronous movement by a threaded spindle.

The provided mounting plate is here connected to the substructure of a vehicle, while in contrast, the support plate is provided for mounting the seating surface with or without a backrest and forms the seating surface, or, as an alternative, includes a recumbent surface. The scissor mountings are located between the mounting plate and the support plate.

In the development of the inventive idea, a bracket with fastening means is associated with the upper scissor elements of at least one longitudinal side. Thus, the longitudinal shiftability of the bracket and the fastening unit is limited on one side of the adjusting device, and the opposite scissor elements are connected to the mounting plate so as to be movable in a pivoting manner with respect to it so that they form a fixed point which stabilizes the upper mounting plate, but permit a tilting due to the bracket with the fastening unit.

The bracket is here directly connected to the support plate, preferably screwed to it, and has a bore in which a guide rod of the fastening unit is received. The fastening unit itself consists of a base with two parallel legs in which the borings are provided to receive the guide rod, so that the shiftability is ensured.

It has to be considered here that each scissor mounting consists of two double scissor arranged in parallel with respect to each other and that these are connected to the fastening unit. The scissor elements of the scissor mountings arranged in parallel are here connected to each other via a rotation pin, while the scissor elements arranged one next to the other each have a separate center of rotation. It is furthermore possible for the fastening unit to be pretensioned with respect to the bracket by at least one spring which rests on the guide rod. By means of the spring, the return of the fastening unit with respect to the bracket can be supported.

Preferably, the fastening means with the bracket and the fastening unit are arranged at the longitudinal side of the adjusting device which also permits a transverse shifting of the mounting plate.

The transverse shifting is already known from the prior application of the applicant, wherein the upper pivot points with the rotation pin are in this case used for receiving a sleeve which is mounted in a pivoting and shifting manner, wherein the sleeve is connected to a bracket of the mounting plate via a radial elongation piece. The bracket permits to pivot the elongation piece, so that the sleeve is movable, depending on the position of the scissor mounting, between the two pivot points which quasi form a stop face. The sleeve here ensures that in case of a tilting of the support plate, for example in case of a lateral inclination to the left or right, there is no tension within the scissor mountings and thus no blocking occurs. In this case, it is sufficient for the left or right scissor mountings of a longitudinal side to be fitted with a movable sleeve, while in contrast, the opposite mountings have a sleeve which is mounted on the rotation pin in a non-shifting manner. By this, with each lateral inclination, a diagonal shifting to the scissor mountings may be compensated and the total weight resting on the support plate is securely and stably held. By the respectively opposite scissor mountings having no axially shifting sleeve along a longitudinal edge, an unintentional lateral shifting of the support plate is prevented. The same applies to the now provided shiftability in the longitudinal direction, i.e. in the direction of travel of the vehicle, wherein both the transverse shifting and the longitudinal shifting can be arranged on one side of the mounting plate, while the opposite side serves to fix the mounting plate. However, it is easily possible that the transverse shifting and the longitudinal shifting are each arranged on another longitudinal side of the mounting plate.

The particular advantage of the present invention is that by means of at least two scissor mountings, preferably 3 or 4 scissor mountings, an individual adjustment of the support plate for a seating surface is permitted. Each individual scissor mounting with four lower and four upper scissor elements, which are each arranged in pairs in parallel, here has an extremely high stability, so that even high loads, for example heavyweight persons, may be moved vertically. Moreover, by means of four scissor mountings, an individual adjustment of the seat's inclination may be achieved, namely with one front or rear tilting of the seating surface or one right- or left-sided tilting of the seating surface. Moreover, with the additionally added fastening means consisting of a bracket and a fastening unit, there is the possibility of a shifting in the direction of travel which is required for a diagonal tilting of the support plate with the seating surface. The bracket and the fastening unit here ensure that no position of the mounting plate leads to a distortion of the individual scissor mountings and these can be returned to their original starting position without any problems. Here, the flat design which may be achieved with the aid of the scissor mountings to permit to retrofit existing vehicles should be particularly emphasized. By optimized control electronics and at least one, preferably a plurality of position sensors, the position of the seating surface can be automatically detected and held in a predetermined position when the vehicle is being moved, for example, on sloping terrain, wherein, independent of a terrain to be driven on, the seating surface is maintained in the preselected position by adjusting the scissor mountings. The drives of the scissor mountings here compensate the irregularities of the terrain, in particular in extremely sloping terrain, and allow the person who is using the vehicle to adjust the optimal sitting position in the position adjusted by him/her even during longer rides. It is moreover possible to individually adjust the sitting position at any time to avoid one-sided loads.

The invention will be illustrated again below with reference to the figures.

DETAILED DESCRIPTION OF THE PREFERRED EMBODIMENTS

Figure 1:
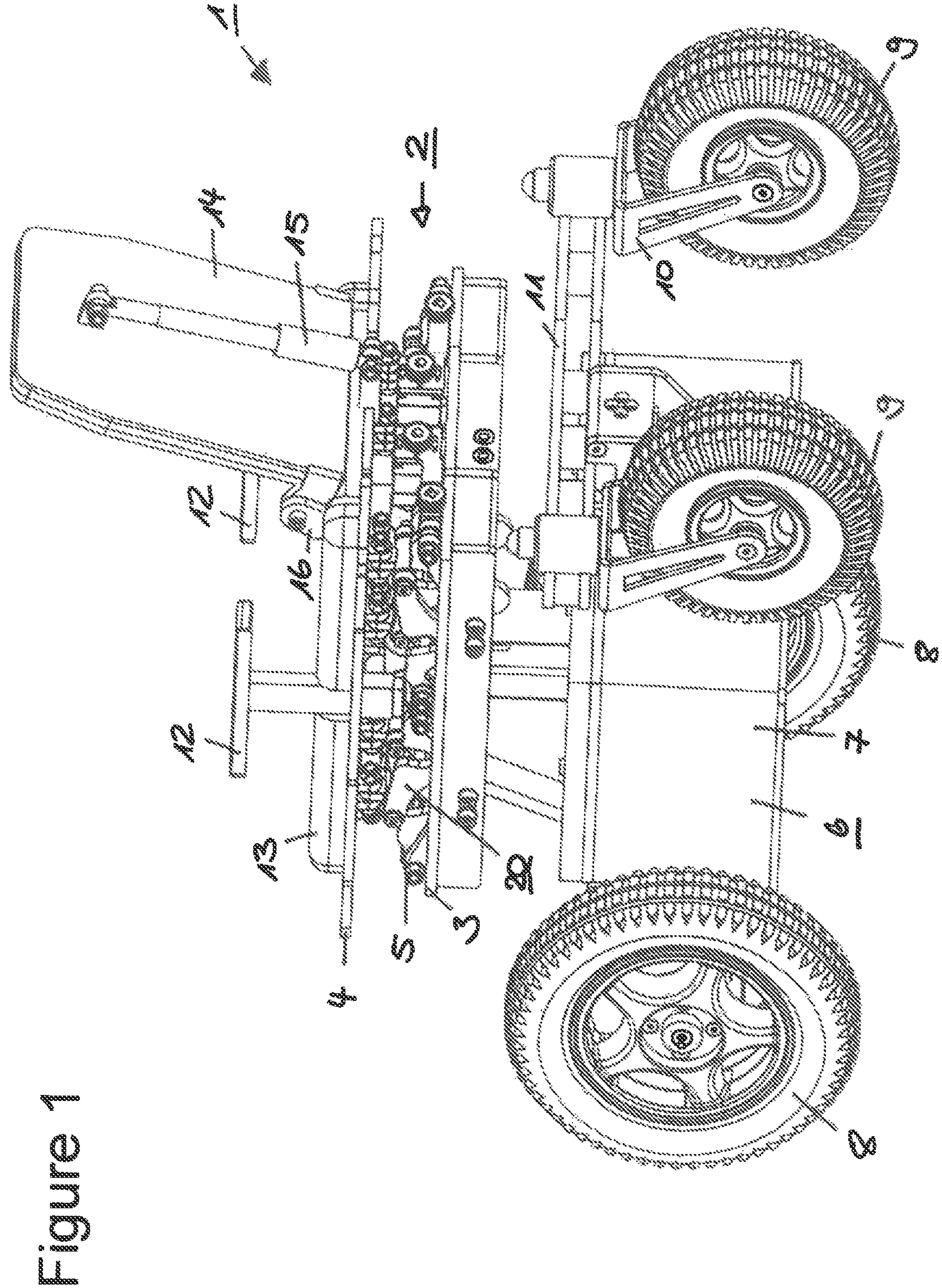
FIG. 1 shows, in a perspective view, a vehicle with an adjusting device for an existing seat.

FIG. 1 shows, in a perspective view, a vehicle 1 with an adjusting device 2, the vehicle being in this case, for example, an electric wheel chair in a very stable design. The adjusting device 2 consists of a mounting plate 3 and a support plate 4 between which the lifting device 5 is arranged. Underneath the mounting plate 3, there is the vehicle substructure 6 which, in this case, consists of a box-shaped housing 7 for accommodating the electronic system and batteries. At the housing 7. two large drive wheels 8 are fixed to motors via a shaft. The drive wheels 8 are in this case designed in a non-steerable manner, however, they are steered indirectly via the two independent motors which may be driven at different speeds. Two further, smaller wheels 9 are mounted in a fork-shaped retainer 10 by means of a rotation pin, the two wheels 9 being connected to each other via an oscillating axle 11 and the oscillating axle 11 being screwed to the box-shaped housing 7. The shown vehicle 1 is thus steered by the drive wheels 8, wherein the operator controls required for this may be integrated, for example, in the arm rests 12.

There are a seating surface 13 and a backrest 14 on the support plate 4, wherein the backrest 14 can be adjusted via an adjusting unit 15 with respect to its inclination. The backrest 14 is to this end mounted via a pivot point 16 in a pivoting manner. The arm rests 12 are located on both sides of the seating surface 13. The stable design of the vehicle 1 exhibits here already that this type of vehicles comprises a cross-country mobility and is moreover suited for heavy-weight persons. Between the mounting plate 3 and the support plate 4, there is the lifting device 5 which consists, in the shown embodiment, of four scissor mountings 20 arranged in the corner regions. The construction of the scissor mountings 20 will become apparent from the following figures.

Figure 2:
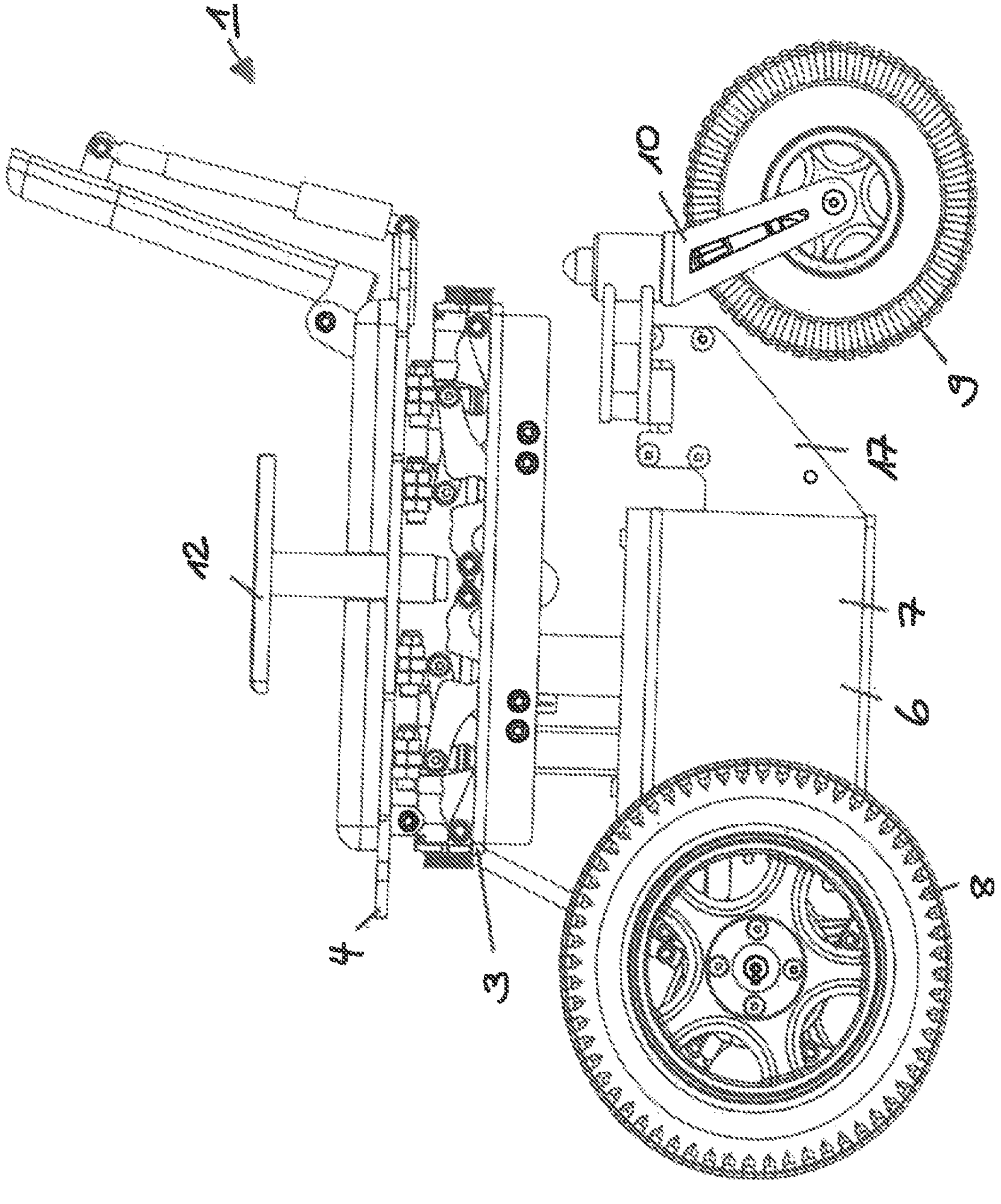
FIG. 2 shows, in a side view, the vehicle known from FIG. 1.

FIG. 2 shows, in a side view, the vehicle 1 known from FIG. 1 with the adjusting device 2 which is arranged between the mounting plate 3 and the support plate 4. This view reveals that the drive wheels 8 are each driven by a motor which is connected to the housing 7. The other, rear wheels 9 are fastened to a bracket 17 attached to the housing 7 via an oscillating axle 11.

Figure 3:
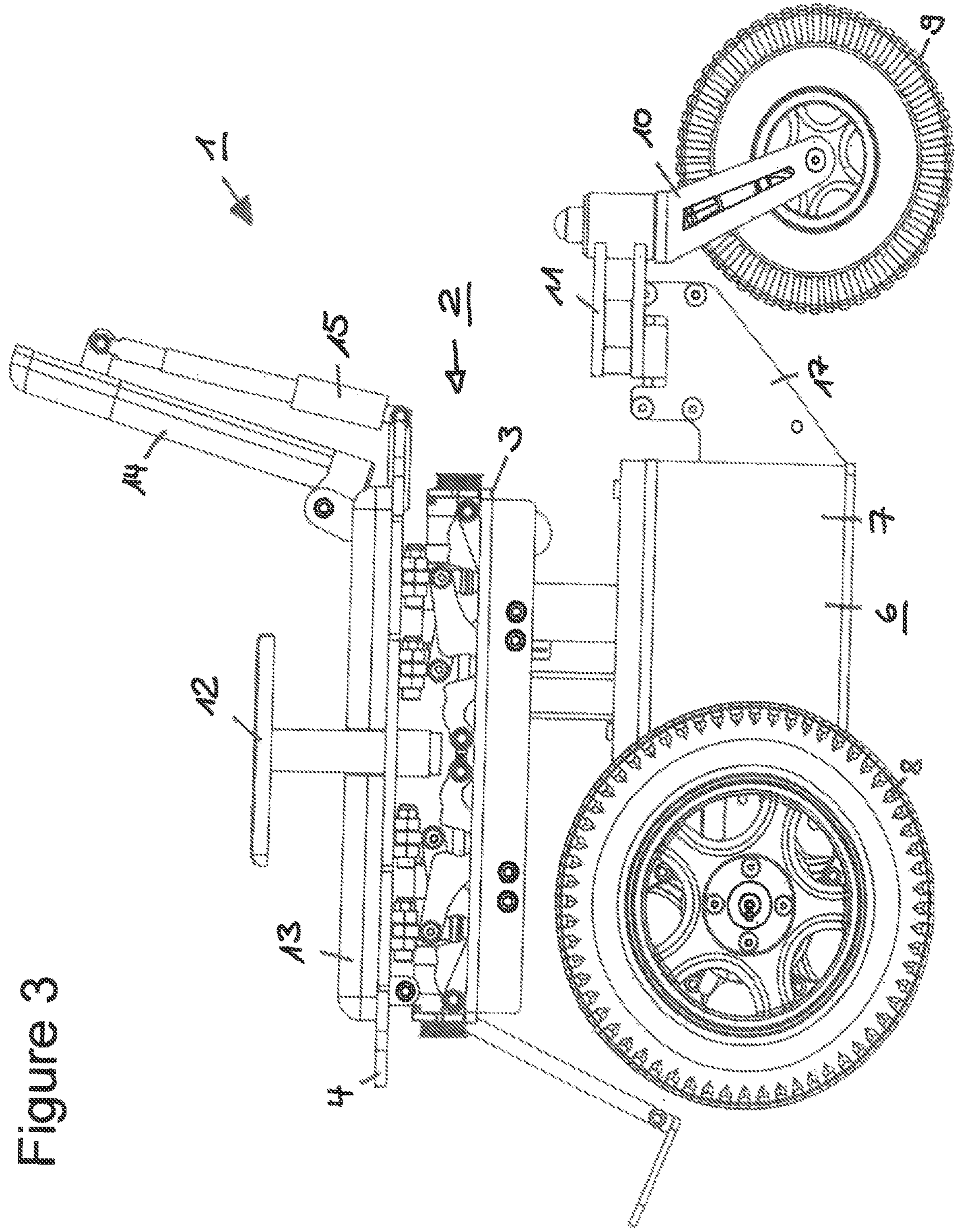
FIG. 3 shows, in a side view, the vehicle according to FIG. 1 with a seating surface shifted to the front.

FIG. 3 shows, in a side view, the vehicle 1 according to FIG. 1, wherein, compared to FIG. 2, the seating surface 13 with the backrest 14 is additionally shifted to the front in the direction of the front drive wheels 8. The adjustment of the sitting position is in this case effected, for example, via a linear drive which is located underneath the mounting plate 3.

Figure 4:
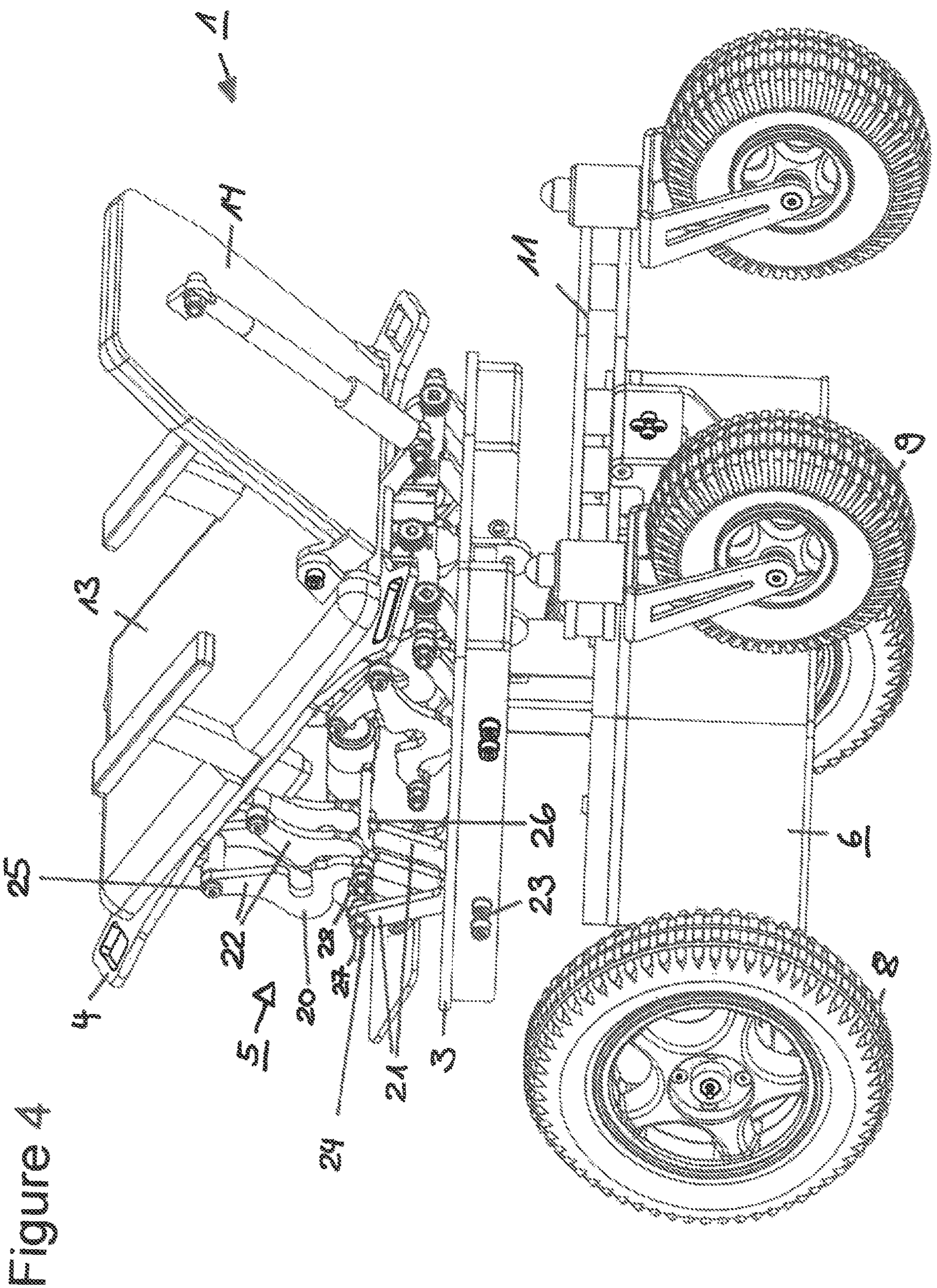
FIG. 4 shows, in a perspective view, the vehicle with a seating surface tilted backwards.

FIG. 4 shows, in a perspective rear view, the vehicle 1 according to FIG. 1 with the lower vehicle's substructure 6 and the seating surface 13 with the backrest 14, wherein the support plate 4 has been lifted with respect to the mounting plate 3 in the front region with the aid of the lifting device 5. The lifting device 5 consists of altogether four scissor mountings 20 which each consist of four lower scissor elements 21 in double pairs and four upper scissor elements 22 in double pairs. Double pairs in this case means two individual scissor elements 21 arranged next to each other and behind each other. The lower scissor elements 21 are connected to the mounting plate 3 in two lower pivot points 23, and at the other end to the second scissor elements 22 in two pivot points 24. The second scissor elements 22 are connected to the support plate 4 in two upper pivot points 25. The connection of the scissor elements 21 and 22 is accomplished in the pivot point 24 via two rotation pins 27, 28, wherein two lower scissor elements 21 in double pairs each can be pivoted to the front and are connected to a rotation pin 27, while the two other scissor elements 21 in double pairs can be pivoted to the back and are connected to a further rotation pin 28. The upper scissor elements 22 are also connected to the pivot point 24 to the first rotation pin 27, so that these can be pivoted to the front, while the two other scissor elements 22 can be pivoted to the back and are connected to the other rotation pin 28. Both rotation pins 27, 28 are equipped with a spindle mount in the central region into which a threaded spindle 26 is screwed. The threaded spindle 26 has, at its both ends, opposed threaded sections, one being a clockwise thread and the other one a counter-clockwise thread, so that in a rotation of the threaded spindle 26, the two rotation pins 27, 28 are moved away from each other or towards each other in the pivot point 24. It is obvious here from FIG. 4, that the scissor mountings 20 in the front region of the vehicle 1 are extended to such an extent that the seat surface 13 is lifted at the front. The two rotation pins 27, 28 of the pivot point 24 are closely arranged next to each other, so that the lower scissor elements 21 are nearly in a vertical position. The upper scissor elements 22 are slightly inclined rearwards. In contrast, the rear scissor mountings 20 are shown in their lowest position in which the two rotation pins 27, 28 of the scissor mountings 20 are arranged at a great distance. Due to the seat inclination, which corresponds to the inclination of the support plate 4, the upper scissor elements 22 of the rear scissor mountings

20 are pivoted and adapt to the position of the support plate 4. This position can also be taken from FIG. 5 below.

Figure 5:
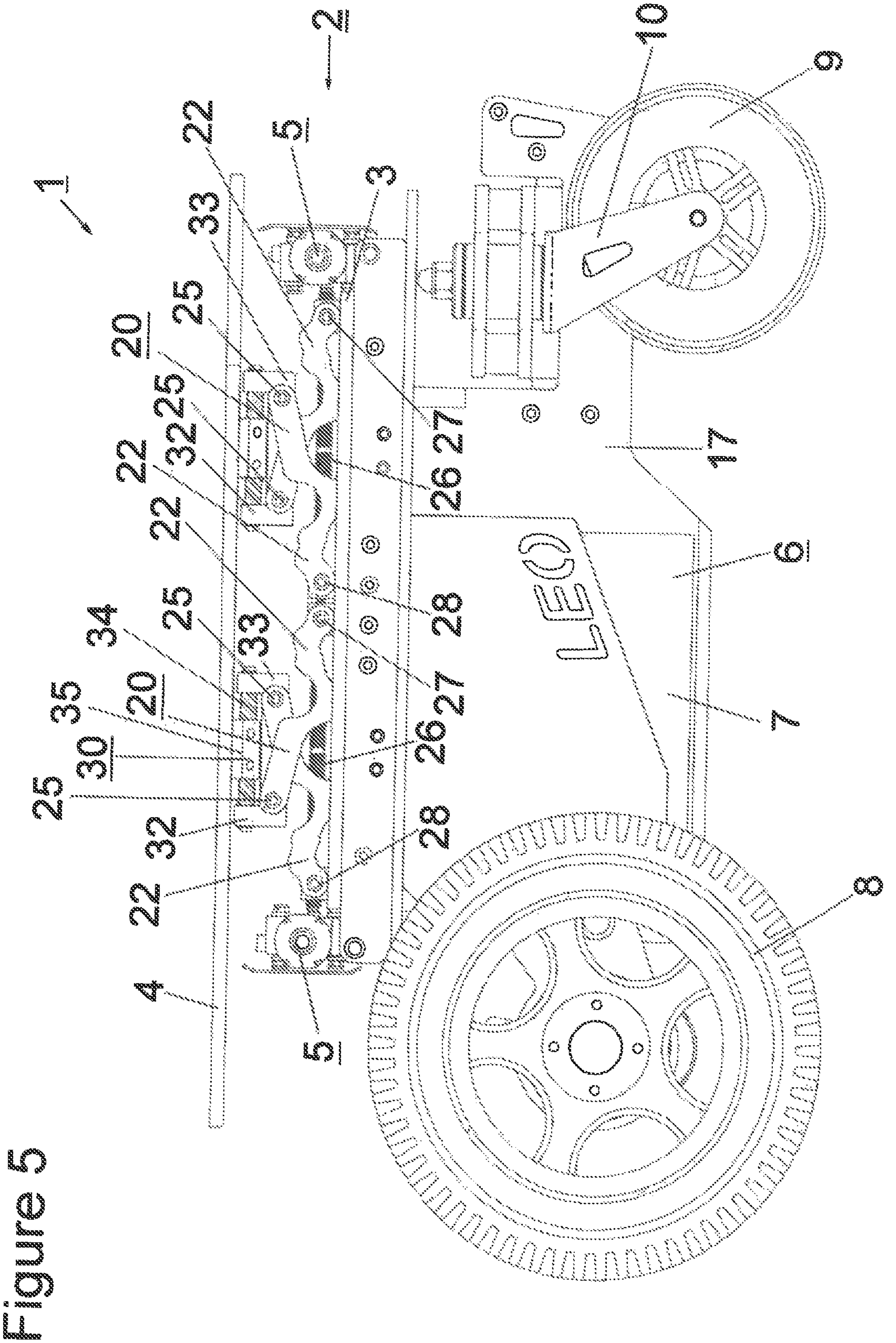
FIG. 5 shows, in a side view, a vehicle with an adjusting device and a longitudinal shiftability with respect to the mounting plate.

FIG. 5 shows, in a side view, a slightly modified vehicle 1' with an adjusting device 2. The vehicle 1' consists of a vehicle substructure 6 with a housing 7 and a bracket 18 which is provided for receiving the steerable rear wheel 9. The front wheels 8, however, are not steerable. A mounting plate 3 is located on the vehicle substructure 6 and is provided for mounting the adjusting device 2. The adjusting device 2 consists of the lifting devices 5, i. e. the corresponding drive motors which drive the spindles 26. The spindles 26 here have two opposed threaded portions so that the scissor mountings 20, which are embodied as double scissor mountings, can be vertically traversed. The scissor mountings 20 here each consist of a lower scissor element 21 and an upper scissor element 22. The scissor mountings 20 are each arranged in double and are located one behind the other, but due to the length of the individual scissor elements 21, 22, it is ensured that an adjustment is possible independent of the adjacent scissor mountings 20. The lower scissor elements 21 are connected to the mounting plate in a non-depicted pivot point and have a rotation pin 27, 28 at the other end which forms the connection to the upper scissor element 22. Both the lower scissor elements 21 and the upper scissor elements 22 are here each connected to each other in pairs and can be vertically traversed via the drive motor via a threaded bracket which is reciprocated on the threaded spindle.

The upper scissor elements 22 are connected to a fastening unit 30 in a pivot point 25 in the shown embodiment, that is, the upper scissor elements 20 each in one single pivot point 25. The fastening unit 30 consists of a base 31 which includes two parallel legs 32, 33 on the end side. Between the legs 32, 33, a guide rod 34 is arranged which is fixed between the legs 32, 33 in a torque-proof manner. The guide rod 34 here rests in a bore of a bracket 35 which is firmly screwed to the mounting plate or otherwise fastened. By means of the fastening unit 30 and the bracket 35, there is a shiftability of the fastening unit 30 with respect to the mounting plate 4, so that a compensation movement is possible in the adjustment of individual scissor mountings 20. This compensation movement prevents a deadlock of the scissor mountings 20 even in extreme positions, for example, in a diagonal tilting of the support plate 4. FIG. 5 shows the support plate 4 in a slightly elevated position without there being any tilting.

Figure 6:
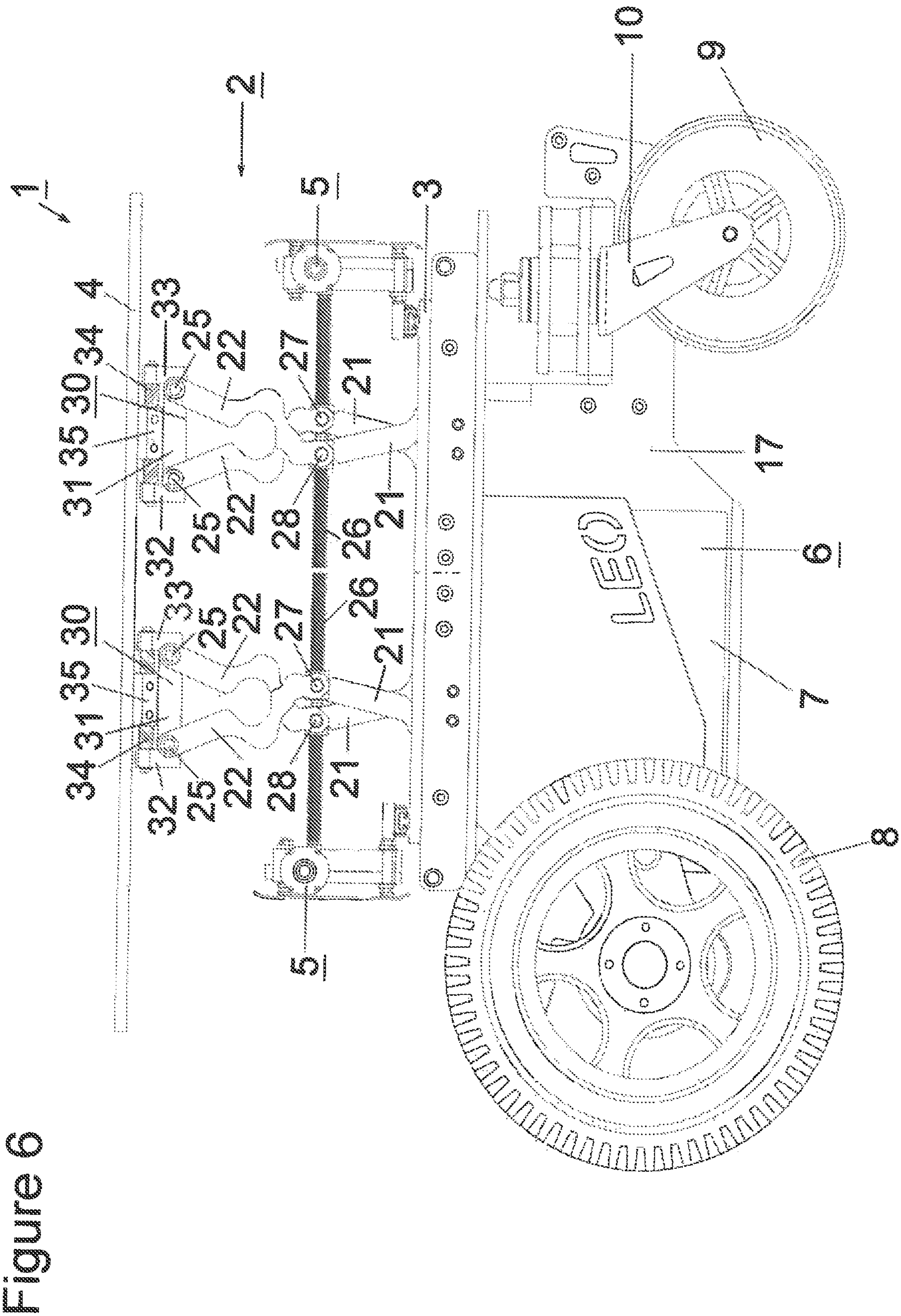
FIG. 6 shows, in a side view, the vehicle with the adjusting device in a position in which the mounting plate has been driven upwards to the maximum height.

FIG. 6 shows the vehicle 1' with the adjusting device 2 according to the structure of FIG. 5 in a side view. In this case, the support plate 4 is represented in an elevated position which illustrates that by means of the lifting device 5, a height adjustment of the scissor mountings 20 is performed, in this case a uniform height adjustment, so that the support plate 4 is lifted parallel to the wheels 8, 9.

Figure 7:
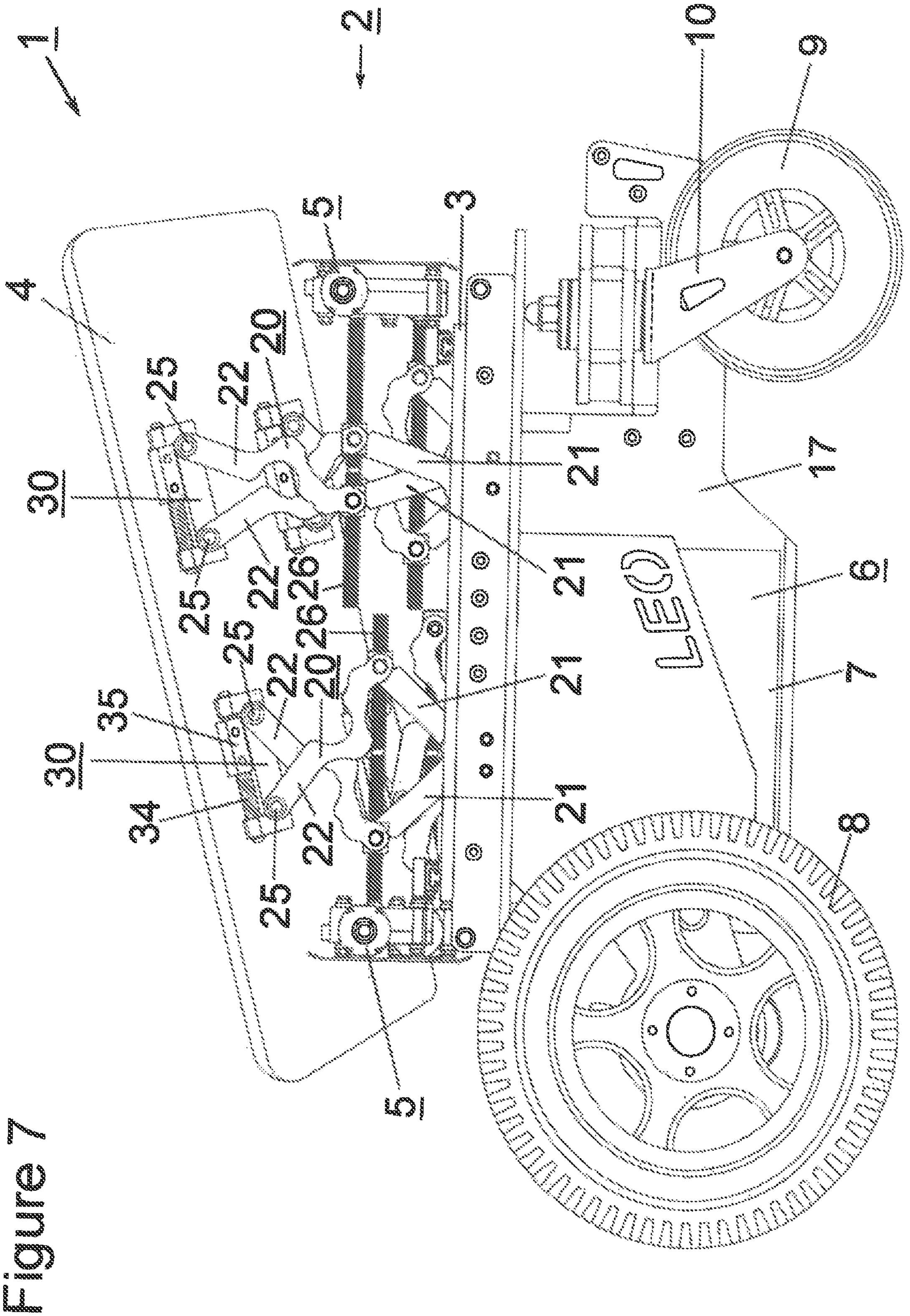
FIG. 7 shows, in a side view, the vehicle with an adjusting device with a diagonal tilting.

FIG. 7 shows the vehicle 1' with the adjusting device 2 in a position of the mounting plate 4 showing a diagonal tilting. By means of the differently lifted scissor mountings 20, the support plate 4 is inclined both to the front and to the side, so that a diagonal tilting is provided. For the scissor mountings 20 not to block each other, in this case, a fastening means consisting of a fastening unit 30 and a bracket 35 is used, wherein the bracket 35, firmly connected to the support plate 4, receives the guide rod 34 which can move in the direction of travel, thus in the axial direction with respect to the bracket 35. Thus, the fastening unit 30 is shiftably mounted in a limited, but sufficient region, so that a deadlock of the scissor mountings 20 is prevented. The fastening unit 30 with the bracket 35 represents an additional structural unit which permits the shiftability in the longitudinal direction. The fastening unit 30 with the bracket 35 here only has to be provided on one longitudinal side of the mounting plate, while the opposite longitudinal side provides an axially stationary linkage of the upper scissor elements 22 to the support plate 4. On the opposite longitudinal side, only a pivoting moveability is required. It is ensured in this manner that the support plate 4 is fixed on one side, and an unintentional movement in the longitudinal direction is not possible. The longitudinal moveability by means of the fastening unit 30 and the bracket 35 is here preferably provided on the longitudinal side of the support plate 4, where a transverse shifting according to prior art is also provided. By these two shifting options, in any position of the scissor mountings 20, there is a moveability which prevents a deadlock of the scissor mountings 20 in case of a diagonal tilting.

LIST OF REFERENCE NUMERALS

1, 1' vehicle
2 adjusting device
3 mounting plate
4 support plate
5 lifting device
6 vehicle's substructure
7 housing
8 drive wheel/rear wheel
8 front wheel
9 rear wheel
10 retainer
11 oscillating axle
12 arm rest
13 seating surface
14 backrest
15 adjusting device
16 pivot point
17 bracket
20 scissor mounting
21 scissor element
22 scissor element
23 pivot point
24 pivot point
25 pivot point
26 threaded spindle
27 rotation pin
28 rotation pin
30 fastening unit
31 base
32 leg
33 leg
34 guide rod
35 bracket

The invention claimed is:

1. Adjusting device (2) for vehicles (1) comprising at least one mounting plate (3) and one support plate (4) with a lifting device (5), which comprises at least two scissor mountings (20) which are arranged at the longitudinal side edge or in a corner region of the mounting (3) or support plate (4) each and are vertically adjustable by a driving means, wherein each scissor mounting (20) is formed as double scissors and includes a first, lower scissor element (21) and a second, upper scissor element (22) which are connected to each other at one end via a common rotation pin, and the lower scissor element (21) is connected at the other end to the mounting plate (3), and the upper scissor element (22) is connected at the other end to the support plate (4) via fastening means, characterized in that at least one fastening means consists of a bracket (35) connected to the support plate (4) and a fastening unit (30) movable with respect to the bracket (35), which bracket (35) includes a bore in which a guide rod is shiftably mounted with respect to the bracket (35) in the direction of travel of the vehicle (1) and at which the ends of the upper scissor elements (22) of at least one scissor mounting (20) are hinged, and wherein the fastening unit (30) with the bracket (35) is provided on one longitudinal side of the support plate (4) only, while the opposition longitudinal side provides a stationary linkage of the upper scissor elements (22) to the support plate (4).

2. Adjusting device (2) according to claim 1, characterized in that the bracket (35) with the fastening unit (30) is assigned to each of the upper scissor elements (22) of one longitudinal side of the support plate (4).

3. Adjusting device (2) according to claim 1, characterized in that the fastening unit (30) includes a base (31) with two parallel legs (32, 33) in which bores are present to receive the guide rod (34).

4. Adjusting device (2) according to claim 1, characterized in that each scissor mounting (20) consists of two double scissors arranged in parallel with respect to each other.

5. Adjusting device (2) according to claim 3, characterized in that the two upper scissor elements (22) of one double scissor are rotationally movably hinged to the base (31) of the fastening unit (30), wherein each upper scissor element (22) has its own pivot point which coincides with the pivot point of the second scissor element (22) of the double scissors arranged in parallel.

6. Adjusting device (2) according to claim 1, characterized in that the fastening means, consisting of the bracket (35) and the fastening unit (30), is arranged at the longitudinal side of the adjusting device (2) which also provides a transverse shifting of the upper scissor elements (22).

7. Adjusting device (2) according to claim 1, characterized in that the scissor elements (21, 22) of one scissor mounting (20) are arranged in one offset plane each such that there is no contact.

8. Adjusting device (2) according to claim 1, wherein the fastening means, consisting of the bracket (35) and the fastening unit (30), is arranged at the longitudinal side of the adjusting device (2) which is opposite the transverse shifting.

9. Adjusting device (2) according to claim 1, wherein said adjusting device (2) is an electric wheel chair, a rehabilitation vehicle, a recumbent system or a nursing bed.

* * * * *